United States Patent
Chien et al.

(10) Patent No.: US 8,370,931 B1
(45) Date of Patent: Feb. 5, 2013

(54) MULTI-BEHAVIOR POLICY MATCHING FOR MALWARE DETECTION

(75) Inventors: Hao-Liang Chien, Linbian Township, Pingtung County (TW); Ming-Chang Shih, Taipei (TW); Chun-Da Wu, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 905 days.

(21) Appl. No.: 12/212,250

(22) Filed: Sep. 17, 2008

(51) Int. Cl.
*G06F 11/00* (2006.01)

(52) U.S. Cl. ............. 726/22; 726/11; 726/26; 713/152; 713/187; 713/188; 709/224

(58) Field of Classification Search ........................ None
See application file for complete search history.

(56) References Cited

U.S. PATENT DOCUMENTS

| | | | |
|---|---|---|---|
| 6,320,848 B1 * | 11/2001 | Edwards et al. | 370/255 |
| 7,620,992 B2 * | 11/2009 | Monastyrsky et al. | 726/24 |
| 7,694,150 B1 * | 4/2010 | Kirby | 713/188 |
| 7,877,806 B2 * | 1/2011 | Repasi et al. | 726/23 |
| 2008/0022407 A1 * | 1/2008 | Repasi et al. | 726/25 |
| 2008/0250500 A1 * | 10/2008 | Olson et al. | 726/23 |
| 2009/0262659 A1 * | 10/2009 | Sturges et al. | 370/253 |

* cited by examiner

*Primary Examiner* — Shewaye Gelagay
(74) *Attorney, Agent, or Firm* — Beyer Law Group LLP

(57) ABSTRACT

Multi-behavior matching in a computer system is performed in order to identify suspicious sequences of activities. System behavior is captured using driver hooks. A behavior monitoring system determines the process to which the system behavior belongs by processing a table. This includes using the process ID and thread ID of the system behavior as lookups into the table. A multi-behavior matching algorithm is applied to determine if there is any matching suspicious behavior by matching sets of rules (a policy) to system events caused by a particular process. A state machine is used to keep track of matching policies. Options to the rules and policies (such as "offset," "depth," "distance," "within," "ordered" and "occurrence/interval") are used to refine when a rule or policy is allowed to produce a positive match, reducing false positives.

8 Claims, 21 Drawing Sheets

Offset Option Example

Offset Option Example

Depth Option Example

Distance Option Example

Within Option Example

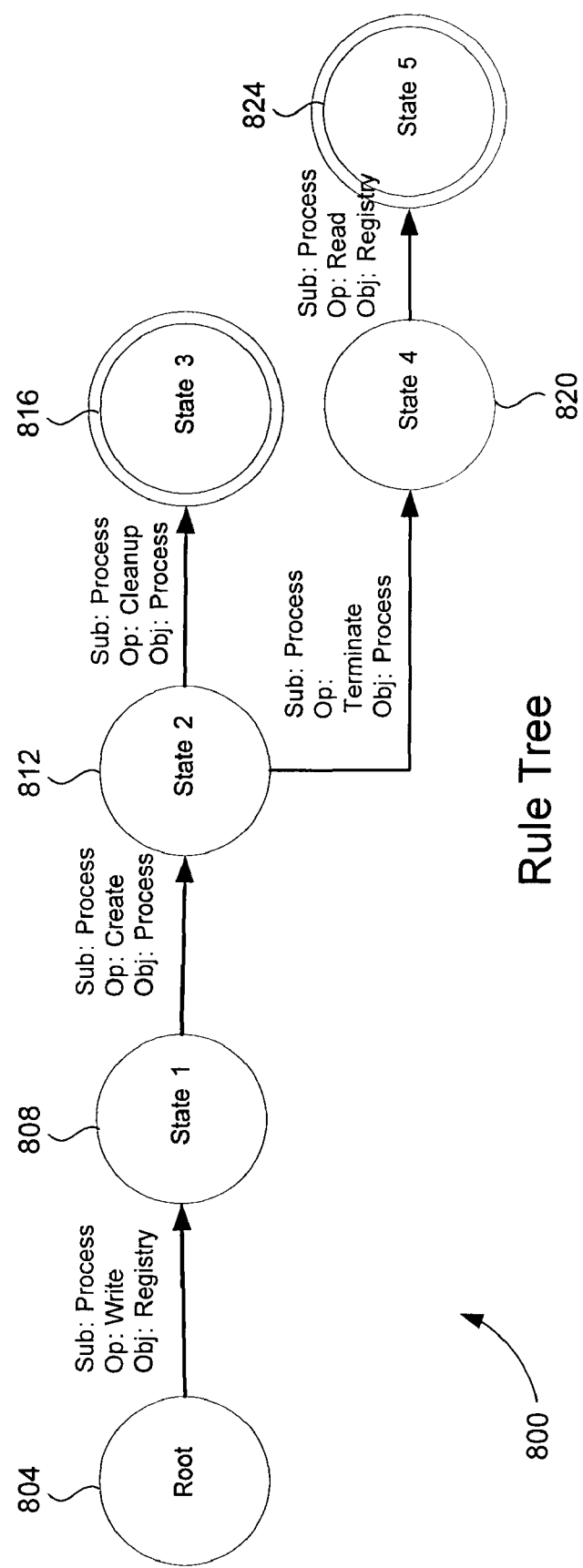
FIG. 8A Rule Tree

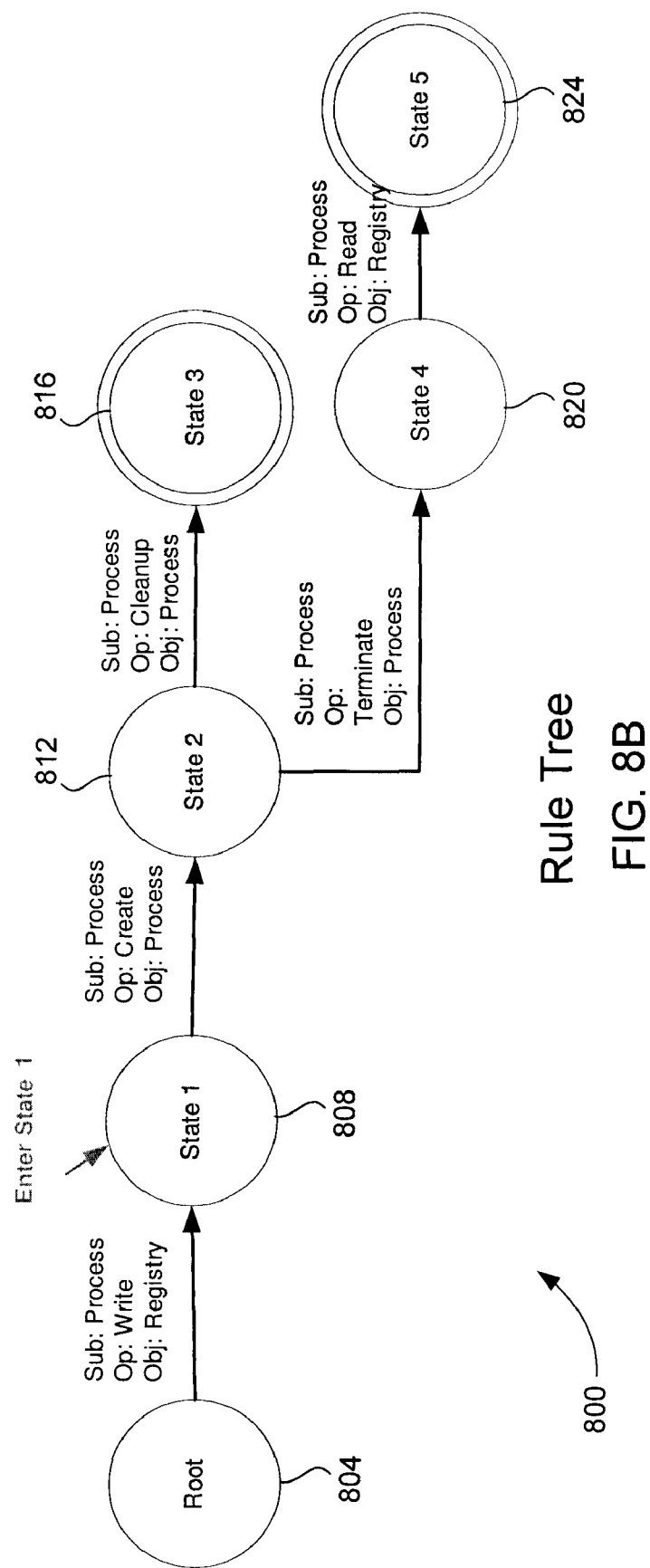
FIG. 8B Rule Tree

Rule Tree

Rule Tree

Rule Tree

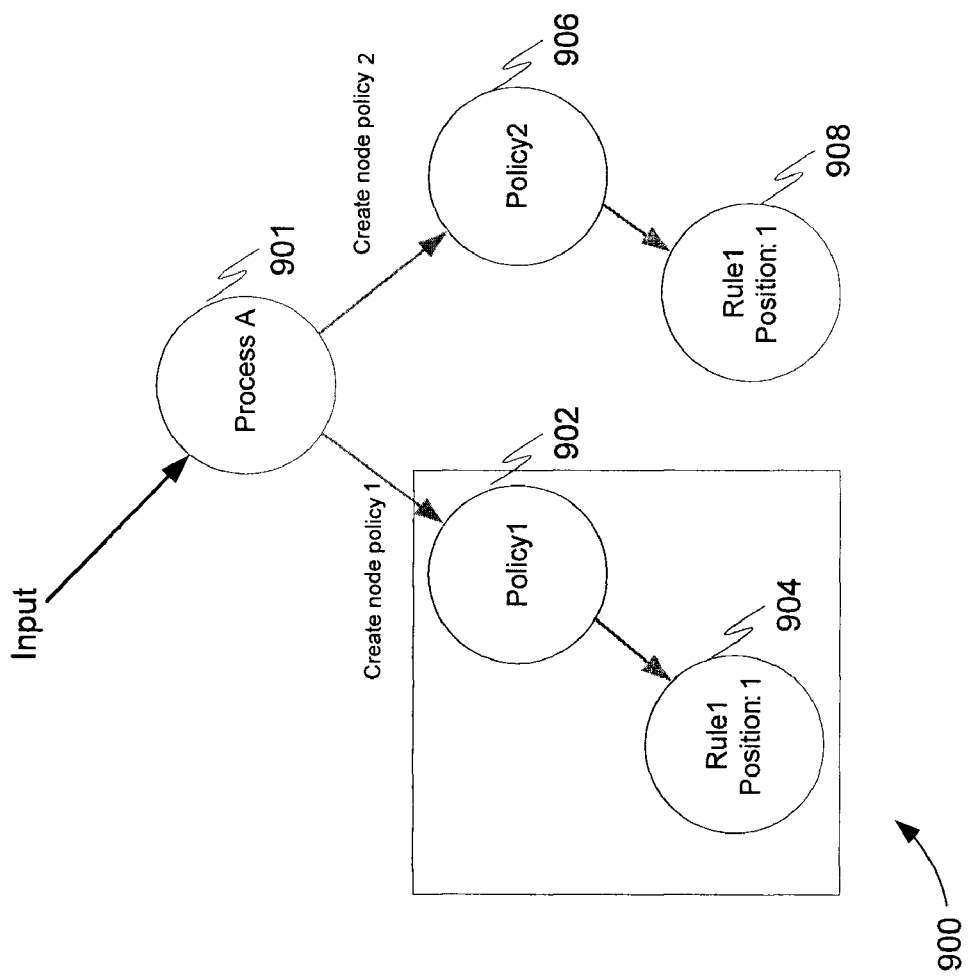

Process A State Tree

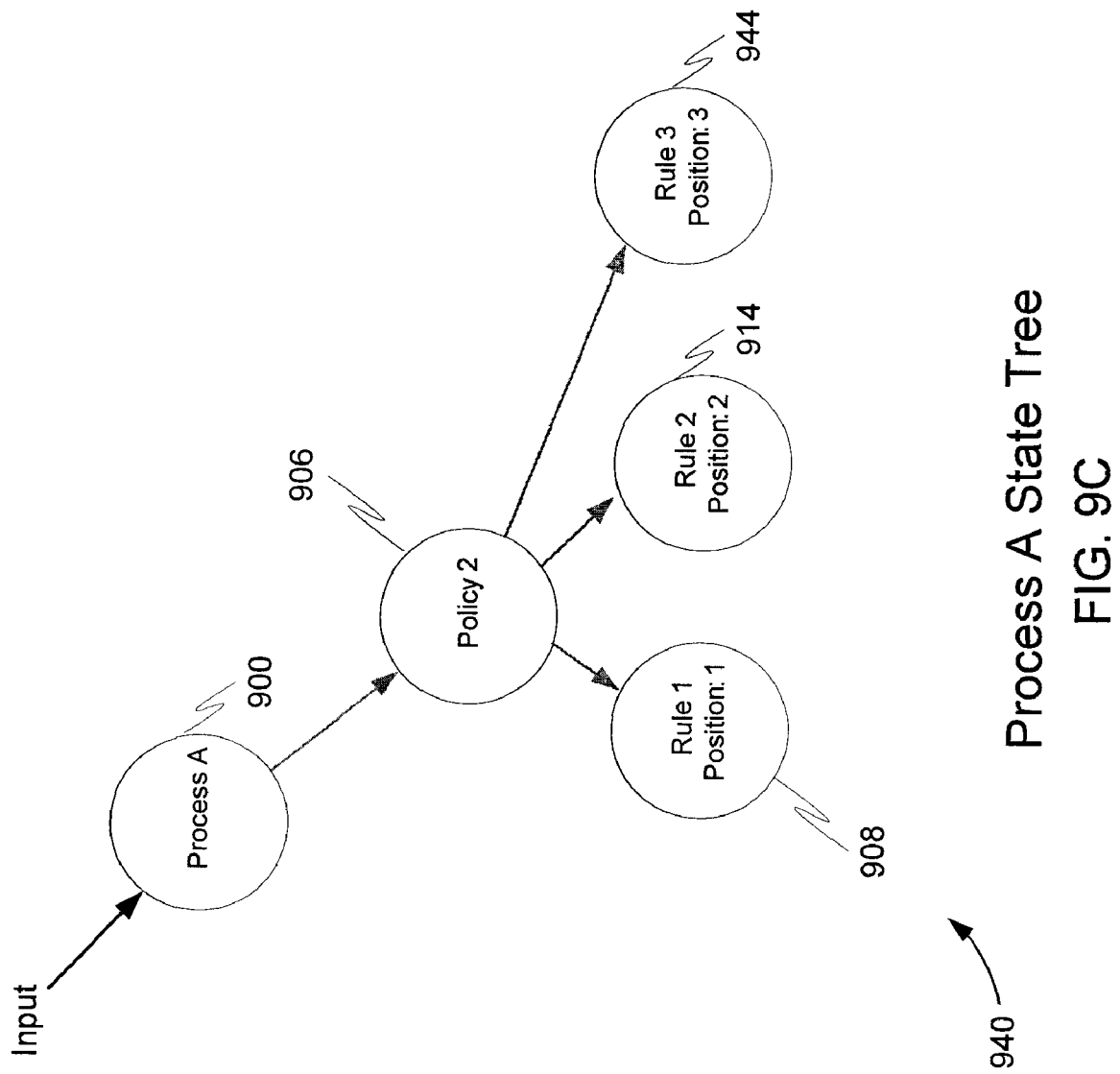

Process A State Tree

MULTI-BEHAVIOR POLICY MATCHING FOR MALWARE DETECTION

FIELD OF THE INVENTION

The present invention relates generally to the detection of malicious code in computer systems. More specifically, the present invention relates to matching system behavior using multiple rules and policies.

BACKGROUND OF THE INVENTION

Malware (such as viruses, spyware, adware, Trojans, worms, etc.), is software designed to infiltrate and/or damage computer systems without their owners' consent. Malware attacks computer systems both large and small, such as workstations, desktop computers, notebook computers, tablet computers, personal digital assistants (PDAs), smart mobile telephones ("smartphones"), etc. and often causes great damage. Needless to say, it is very important to protect computer systems against various forms of malware.

Many software applications have been developed to protect computer systems against various types of malware. Examples of anti-malware software products include Symantec'S™ Norton AntiVirus, McAfee's® VirusScan® Plus, BitDefender's Total Security, etc. Typically, once such a software application has been installed on a computer system, it may scan the entire computer system, i.e., the files on the computer system, or a selected portion of the computer system from time to time to detect and remove known types of malware.

Recently, it has become more commonplace for anti-malware software products to forgo complete directory scanning and instead watch for suspicious behavior in the computer system for clues as to which files to scan. As hard drives become increasingly large, and thus increasingly more time consuming to scan as a whole, it is expected that this trend towards background virus scanning will continue.

In such systems, it is necessary to monitor system behavior, and then apply a rule to the monitored behavior in order to determine whether an activity is suspicious or not. The drawback to such an approach is that many types of malware are not reliably detectable by looking for a single activity in using a single rule. Certain malware often cause multiple activities to be performed, each individually not being very suspicious.

Considering the previous approach of looking for a single suspicious activity and its disadvantages, a behavior monitoring system is desired that would be able to identify sequences of activities that are suspicious while not falsely identifying innocent individual activities as suspicious.

SUMMARY OF THE INVENTION

Multi-behavior matching in a computer system is performed in order to identify suspicious sequences of activities caused by executing software. System behavior is captured by, for example, driver hooks. The behavior monitoring system determines the process state to which the system behavior belongs by accessing a state table. This includes, for example, using the process ID and thread ID of the system behavior as lookups into the state table. Then a multi-behavior matching algorithm is applied to the captured system events for a particular process in order to determine if there is any matching suspicious behavior.

New options for applying rules and policies are added in order to aid in the detection of malware using multi-behavior matching. The first of these options is an "offset" option. This option modifies the starting search position in the list of captured events for the behavior matching algorithm. In the prior art, normally a search for a matching rule would begin at the very first event produced by a particular running process. This offset option is useful for preventing the behavior matching algorithm from performing inefficient searches if the likely search region for a given set of rules is not at the very beginning of a list of captured events.

The second new option is a "depth" option. The depth option sets the maximum search depth for a search from the beginning of the search region. This is useful for preventing inefficient searches once the possible search region for a given set of rules has been exceeded.

The third new option is a "distance" option. The distance option is relative to a previously matched event. The distance option indicates that the distance between two matched events must be greater than or equal to the specified distance.

The fourth new option is a "within" option. The within option is relative to a previously matched event. The within option indicates that the distance between two matched events must be less than or equal to the specified "within" option.

A fifth new option is the "ordered" option. When used, the ordered option indicates that the rules in the policy must match events in the same order that the rules occur in the policy.

A pattern match function is used to attempt to match rules in the policy with the captured events. A behavior matching algorithm is implemented using a state machine to determine if any policy matches the captured system events for a particular process while taking any enabled options into account. The behavior monitoring system outputs a result of a matched policy if such a match is found.

The above options are useful because normal processes have a long lifetime, and will cause many events during the process's existence. If options such as offset or depth are not used to reduce the range in which events are examined, then normal processes may match a policy after executing for a long period of time. For example, most viruses infect a file in a few seconds, for example, using the actions "open file," "write virus code" and "change entry point." These three events are typically continuous and happen in just a few seconds. But, a normal application may still perform these actions at some point during its operation. But, the difference between a virus performing these actions and a normal application performing these actions is the event order and the timing, for example. Thus, options are used to distinguish a normal process from a malicious process.

BRIEF DESCRIPTION OF THE DRAWINGS

The invention, together with further advantages thereof, may best be understood by reference to the following description taken in conjunction with the accompanying drawings in which:

FIG. 8A is a diagram illustrating an example database tree for the policy in accordance with an embodiment of the present invention.

FIG. 8B is a diagram illustrating the example database tree having entered state 1 in accordance with an embodiment of the present invention.

FIG. 9A is a diagram illustrating a process state tree after a first state in accordance with an embodiment of the present invention.

FIG. 9C is a diagram illustrating a process state tree after a fourth state in accordance with an embodiment of the present invention.

DETAILED DESCRIPTION OF THE INVENTION

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

Overview

The behavior monitoring system of the present invention uses a rules database to hold the rules and policies used to detect suspicious behavior in a computer system. Various options (discussed below) may be used to further refine the rules and policies that are used in order to eliminate false positives and to more accurately detect malware. As discussed below, events that occur during execution of a process in a computer system are compared against the rules to help determine suspicious behavior. These rules, policies and options may be generated using a variety of manners for use with the present invention and may be stored locally or retrieved from a remote database. In one specific embodiment of the invention, the rules, policies and options used herein are generated using techniques disclosed in application Ser. No. 12/212,378, filed on even date herewith, entitled "Malware Behavior Analysis and Policy Creation", which is hereby incorporated by reference.

Figure 1:
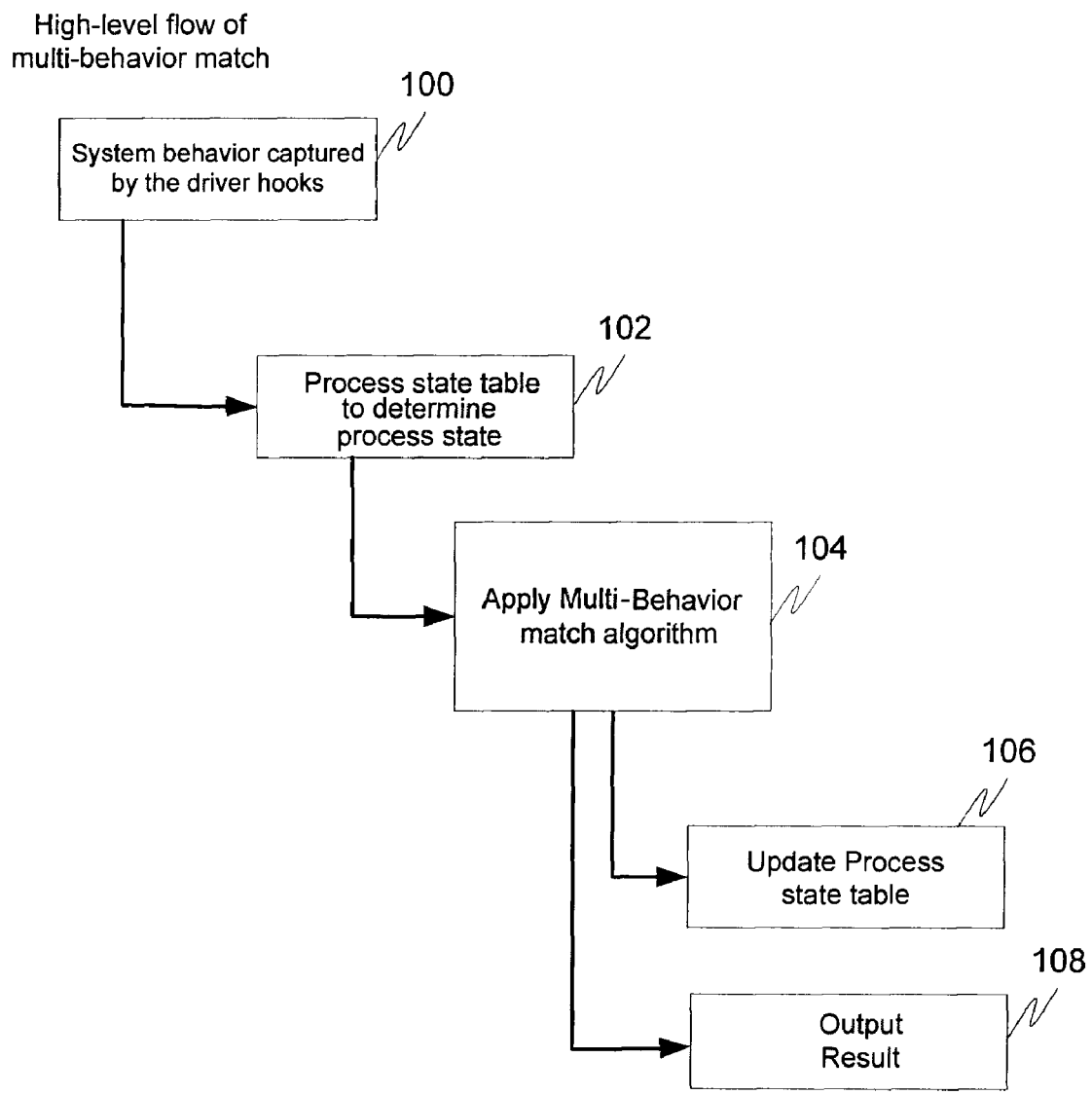
FIG. 1 is a high-level flow diagram illustrating the flow of a multi-behavior match in accordance with an embodiment of the present invention.
Figure 13:
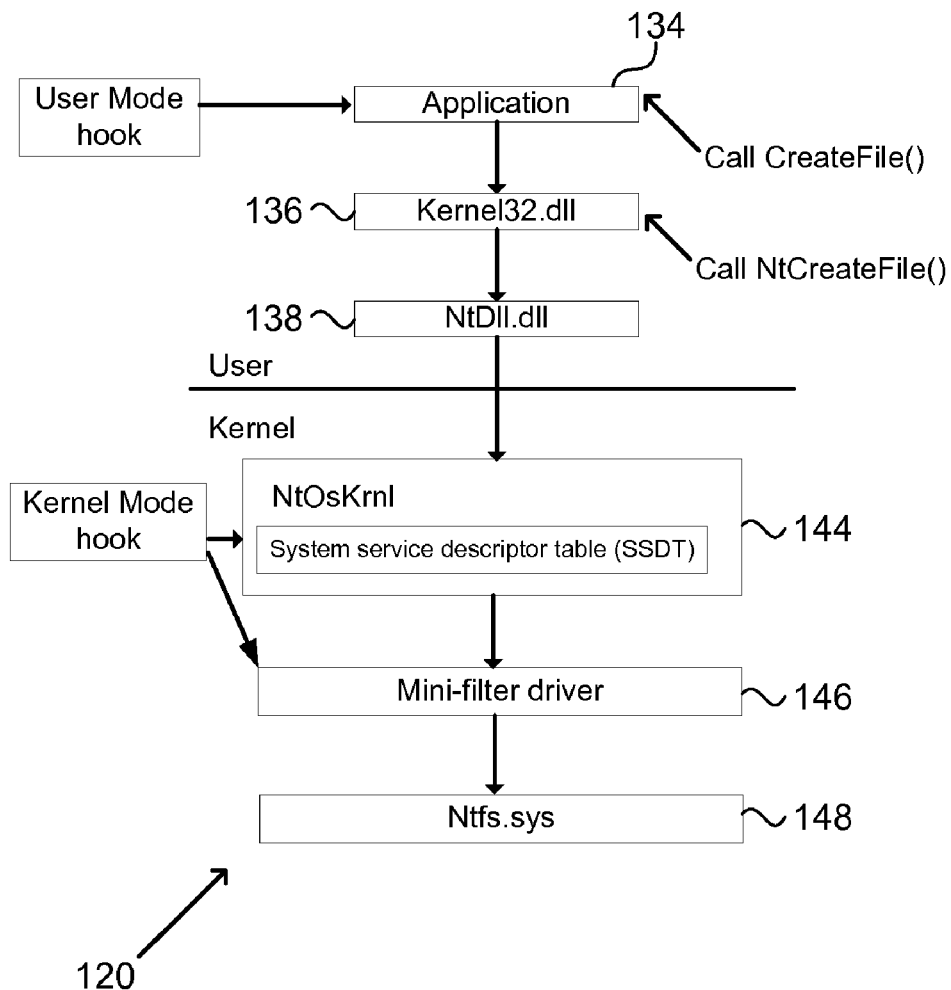
FIG. 13 is an example block diagram for capturing of system behavior in accordance with an embodiment of the present invention.

In an embodiment of the present invention, multi-behavior matching in a computer system is performed in order to identify suspicious sequences of activities. FIG. 1 is a diagram illustrating the flow of multi-behavior matching in accordance with an embodiment of the present invention. At 100, system behavior (system events) is captured by driver hooks using module 1004. Two techniques are used to capture system events. The first technique is by using a kernel mode hook which includes an SSDT hook and a mini-filter hook. The kernel mode hook can capture all events which are sent to the Operating System kernel. The second technique is by using a user mode hook and DLL injection. DLL injection is used to monitor the specific application with which we are interested; DLL injection will hook all APIs used in the application. FIG. 13 illustrates an example 120. For the user mode hook, application 134 calls "CreateFile," which in turn causes "NtCreateFile" 136 to be called in DLL 138. For the kernel mode hook, included is an SSDT hook 144 and a mini-filter hook 146.

Preferably, all events are captured for all running processes. Each captured event includes a process identifier and a thread identifier. Based upon an identification of which process caused which events, an event list per process can then be formed that shows chronologically the events that a process has caused. These events can then be analyzed by comparison to a policy of one or more rules. For example, FIGS. 2-7 illustrate lists of events (captured behavior) that each pertain to a particular process that may or may not be malicious.

At 102, the system determines the process to which the captured behavior belongs by referencing a process mapping table. This step includes using the process identifier and thread identifier of the system behavior as lookups into the process mapping table. This step allows the monitoring system to focus on those events caused by particular processes that will be analyzed. Thus, because each captured system event includes the process identifier and the thread identifier, we can use these specific identifiers to find out specific process information. In a first step, we determine the process index from the process mapping table by using the process identifier and thread identifier. In a second step, according to the process index, we can retrieve process information from the process information table. The process information table includes a pointer to the process state tree described below, and also includes information such as process creation time, process identifier, etc.

At 104, a multi-behavior matching algorithm is applied to the captured system events using module 1008 to determine if there is any matching suspicious behavior. The matching algorithm is applied to captured events from all processes. This matching algorithm uses the rules, policies and options as further described below to determine if a particular process is suspicious or malicious. In other words, even though all events are captured, the rules of a policy are applied against each set of captured events of a particular process to determine if that process is malicious.

For example, a general policy might be worded in English as "if a process tries to perform DLL injection, that behavior is very dangerous and should be flagged." The policy can be written formally for use in the monitoring system by the following rules: Rule 1 ("Any process" Open "Another process"); Rule 2 ("Any process" Call GetProcAddress); Rule 3 ("Any process" Call VirtualAllocEx); Rule 4 ("Any process" Call WriteProcessMemory); and Rule 5 ("Any process" Call CreateRemoteThread). Thus, the rules of the policy describe the flow of a DLL injection routine. If the captured events of any process in the computer system match the rules of the policy the user is informed that the process is suspicious (or other action can be taken).

After this, at 106, the process state tree for each process is updated. Each process uses a state tree (see examples of FIGS. 9A-9D) which includes process information such as the matching status of each policy, which rules have been matched, and the position of a matched event in the list of events for the particular process. In the state tree for a process are recorded the rules that have been matched. For example, in FIG. 9A, events of process A have matched rule 1 of policy 1 and rule 1 of policy 2. Now in FIG. 9B, other events match rule 2 of policy 1 and rule 2 of policy 2; these nodes are inserted into the state tree. Note that rule 1 of policy 1 has not matched due to an option, so only rule 2 is listed under policy 1, and the entire policy 1 has not yet matched. The state tree for each process is updated in order to keep the policy matching status for each process current.

At 108, the result of the behavior matching algorithm is output. If the result is that no policy has been matched, then no action need be taken. Or, the behavior monitoring system may return to step 100 in order to begin capturing system events corresponding to a different process to determine if any suspicious behavior is present. In addition, the flow of FIG. 1 may be implemented simultaneously in parallel (or serially) in order to analyze any number of sets of captured system events for any number of processes executing within a computer system. If the result is that a policy has been matched, then the process for which the captured system events have been analyzed (and which produced a positive policy match) is flagged as being suspicious and possible malware. Preferably all events are assigned to processes and are analyzed as they occur in real time, to determine if any particular process is suspicious.

The behavior monitoring system (or another software module) may then take action to scan the offending file (corresponding to the flagged process) for a computer virus by calling a virus scan engine, to alert the user of the suspicious file, to continue to analyze system events caused by the suspicious file, to perform recovery, to terminate the malicious process or to provide feedback. Recovery involves reviewing the event record of the malicious process that has been detected, and then undoing any malicious behavior that the process has inflicted upon the computer. For example, if the malicious process has dropped a registry key or modified a file, recovery involves recovering the registry key or recovering the original file. Terminating the process also may include blocking any identified behaviors of the malicious process. Feedback involves providing the behavior and process information (including the process image path, SHA1, CRC, and source) to an antivirus company such as Trend Micro, Inc.

It should be noted that the rules may take many forms. In one embodiment, a rule takes the form of "(Subject Operation Object)", where Subject indicates whether to perform a process or not, Operation indicates the type of process, and Object represents to what to apply the process. Preferably, the format of a rule matches the format of a captured system event so that captured system events may readily be compared to rules in a policy. A policy is a collection of rules (sometimes called a "behavior list" or an "event list") that typically must match a set of captured events in order to indicate a likelihood that the events (and ultimately, the process and file causing the events to occur) are caused by malware. As described below, options for rules and policies are introduced to further refine when a particular rule can match an event or when rules in a policy are allowed to match. These options reduce false positives and allow for more accurate determination of malware.

Options for Rules and Policies

In an embodiment of the present invention, new options for applying rules and policies are added in order to aid in the detection of malware using multi-behavior matching. These options may apply to a single rule, the interaction between multiple rules, or to the overall policy. These options are determined manually by a software engineer.

The first of these options is an "offset" option for a particular policy. The offset option is used as a modifier to a policy. This option modifies the starting search position for the behavior matching algorithm. Normally, a prior art search would start at the first event caused by a particular process. The offset option allows any number of initial events to be ignored and for the matching algorithm to begin attempting matches at a later point in the list of captured events. The offset option is useful for preventing the behavior matching algorithm from performing inefficient searches if the possible search region for a given set of rules does not occur until later in a set of captured events. For example, it might be that a particular suspicious behavior is only executed after the computer system has been operating for awhile or only after a particular process has caused a certain number of innocuous events to occur. As such, a certain numerical offset may be designated for a particular policy in order to skip introductory processes and events (such as system startup processes and associated events) thus limiting the number of unproductive matching attempts and also limiting the number of false positives.

Figure 2:
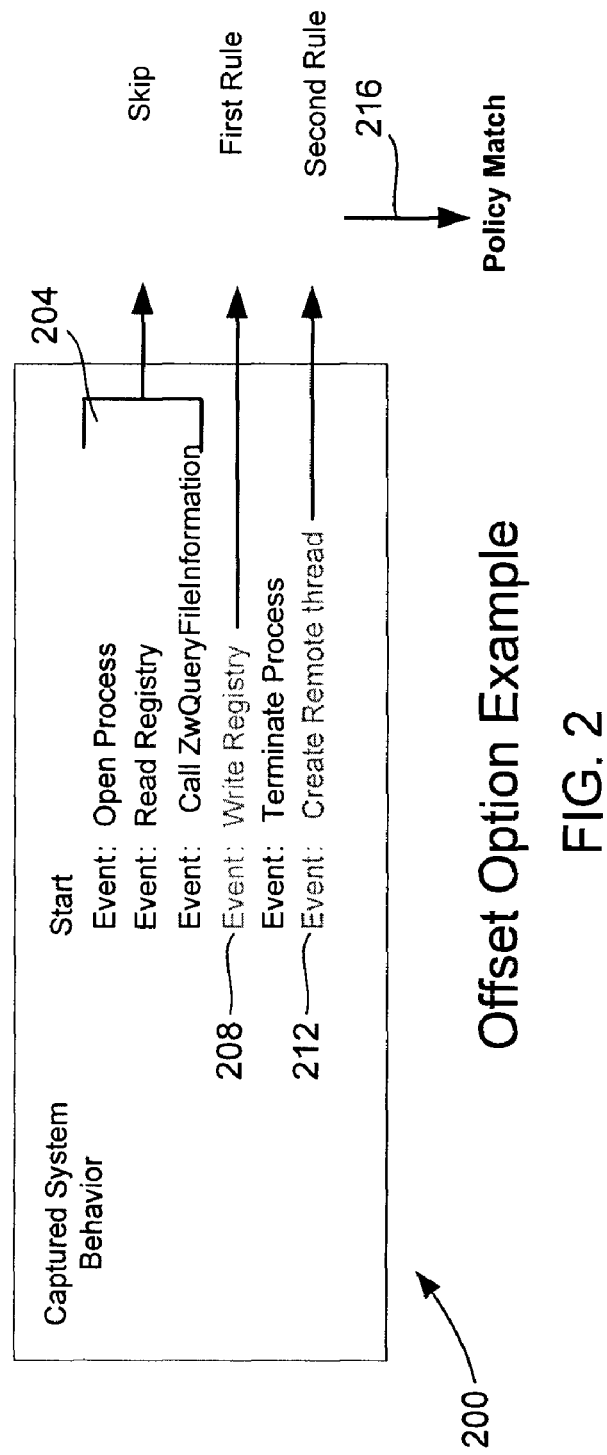
FIG. 2 is a diagram illustrating an example of the offset option in accordance with an embodiment of the present invention.

FIG. 2 is a diagram illustrating an example 200 of use of the offset option in accordance with an embodiment of the present invention. Here, an offset of 3 is used. The policy used in this example includes two rules: (Process Write Registry) and (Process Create Process). The offset value of 3 indicates that behavior monitoring system 1000 should only start looking for matches for the rules after the first 3 events. Therefore, the first three events in the captured system behavior for a particular process (Open Process, Read Registry, and Call ZwQueryFile Information) are skipped when applying the matching algorithm. A match for the first rule is found in execution of the fourth event 208, while a match for the second rule is found in the execution of the sixth event 212. Output 216 indicates the policy has been matched.

The second new option is a "depth" option. The depth option sets the maximum search depth for the behavior matching algorithm from the beginning of its search region. This is useful for preventing the matching algorithm from performing inefficient searches when it is unlikely that later events are caused by malware.

Figure 3:
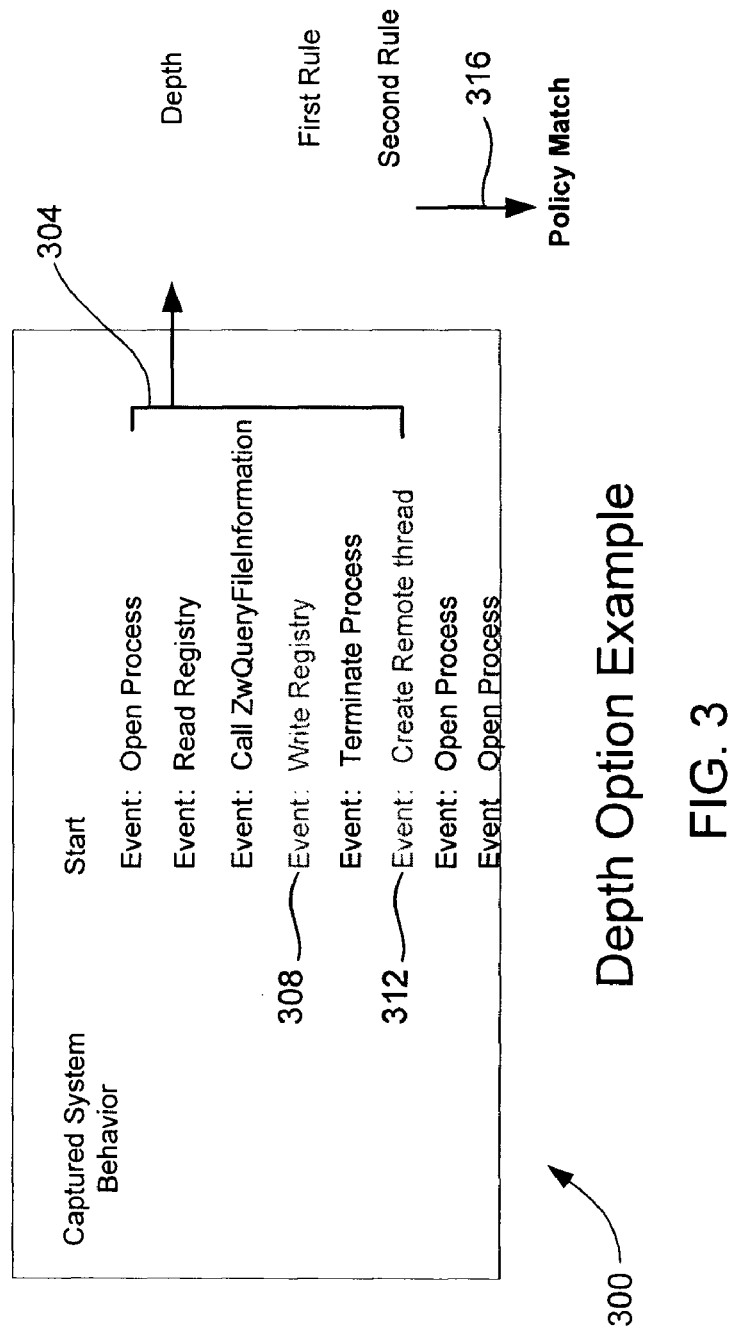
FIG. 3 is a diagram illustrating an example of the depth option in accordance with an embodiment of the present invention.

FIG. 3 is a diagram illustrating an example 300 of use of the depth option in accordance with an embodiment of the present invention. Here, a depth of 6 is used. The policy includes two rules: (Process Write Registry) and (Process Create Process). The depth of 6 indicates that only the first six events 304 (assuming that comparison begins with the first captured event) of the captured events will be sent to state machine 1008 for behavior matching with the policy. As shown, the rules match events 308 and 312. Output 316 indicates the policy is matched.

The third new option is a "distance" option. The distance option relates to two events and is relative to a previously matched event. The distance option indicates that the distance between the two matched events must be greater than or equal to the specified distance, otherwise, no match.

Figure 4:
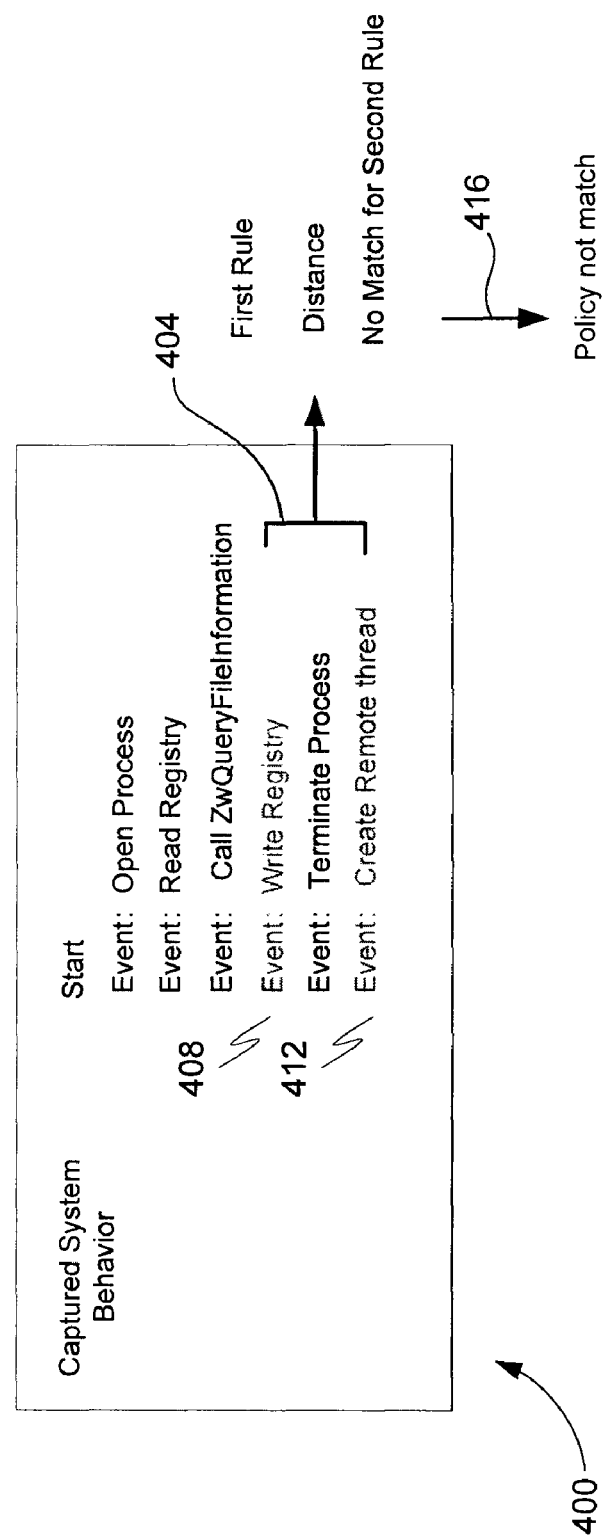
FIG. 4 is a diagram illustrating an example of the distance option where the policy does not match in accordance with an embodiment of the present invention.

FIG. 4 is a diagram illustrating an example 400 of the distance option where the policy does not match. Here, a distance option of 2 is used. The policy includes the rules: (Process Write Registry) and (Process Create Process). Here, the distance 404 between the two matched events 408, 412 is only 1, which is one less than the specified distance of 2. Hence, even though the events specified in the rules are matched, the policy is not matched, as indicated by output 416.

Figure 5:
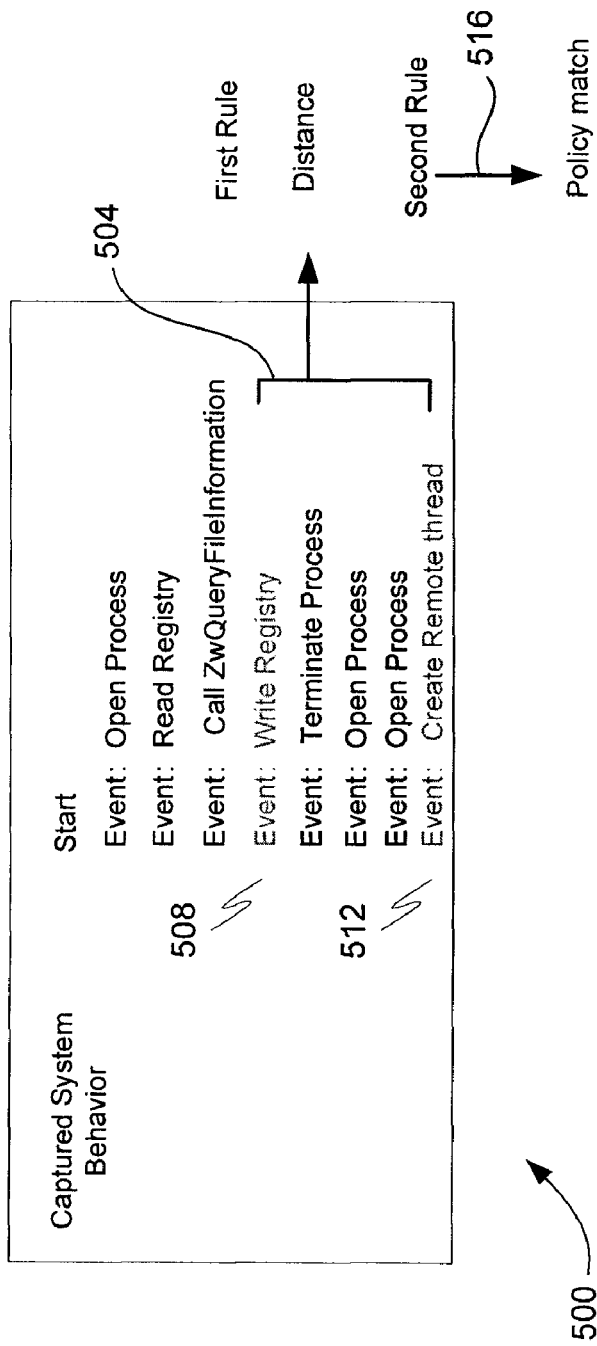
FIG. 5 is a diagram illustrating an example of the distance option where the policy matches in accordance with an embodiment of the present invention.

FIG. 5 is a diagram illustrating an example 500 of use of the distance option where the policy does match. Here, a distance of 2 is used. The policy includes the rules: (Process Write Registry) and (Process Create Process). Here, the distance between the two matched events 508, 512 is 3, which is greater than the specified distance of 2. Hence, the policy matches, as indicated by output 516.

The fourth new option is a "within" option. "Within" is relative to a previously matched event and relates to two matched events. The "within" option indicates that the distance between the two matched events must be less than or equal to the specified "within" option.

Figure 6:
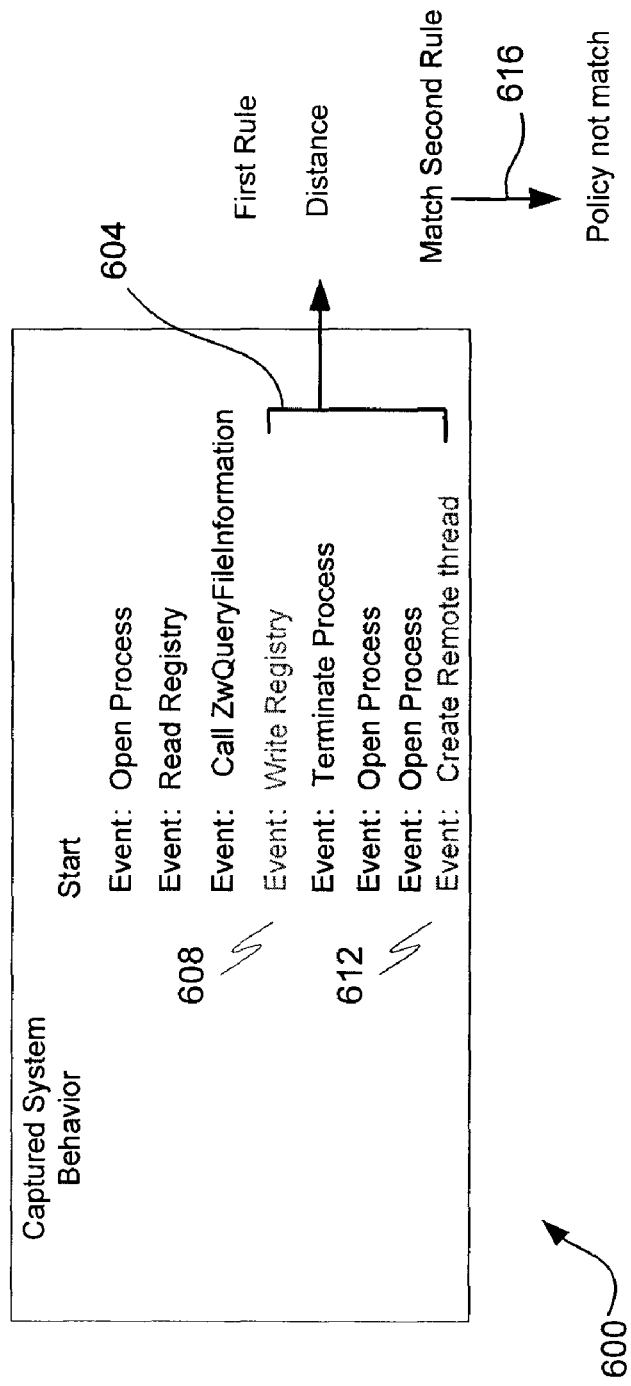
FIG. 6 is a diagram illustrating an example of the within option where the policy does not match in accordance with an embodiment of the present invention.

FIG. 6 is a diagram illustrating an example 600 of the "within" option where the policy does not match. Here, a "within" value of 2 is used. The policy includes the rules: (Process Write Registry) and (Process Create Process). Here, the distance between the two matched events 608, 622 is 3, which is greater than the specified "within" distance of 2. Hence, even though the events specified in the rules are matched, the policy is not matched, as indicated by output 616.

Figure 7:
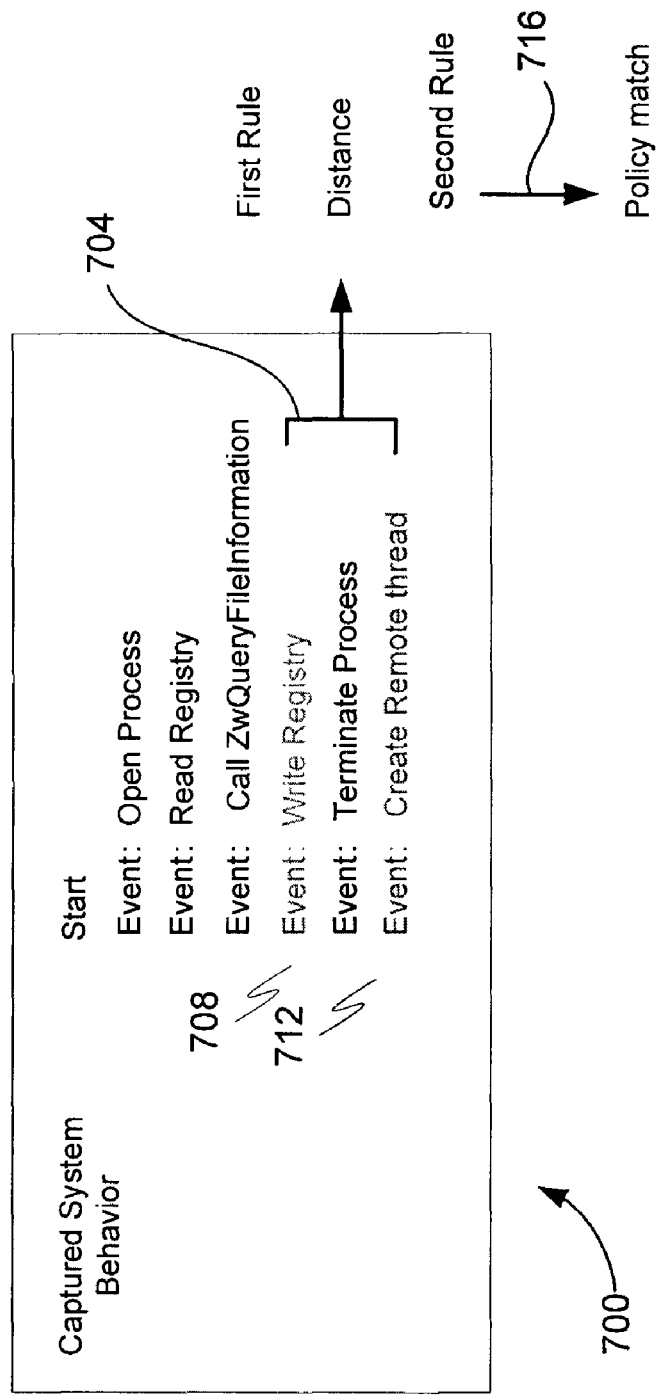
FIG. 7 is a diagram illustrating an example of the within option where the policy matches in accordance with an embodiment of the present invention.

FIG. 7 is a diagram illustrating an example 700 of the "within" option where the policy does match. Here, a "within" distance of 2 is used. The policy includes the rules: (Process Write Registry) and (Process Create Process). Here, the distance between the two matched events 708, 712 is only 1, which is one less than the specified "within" distance of 2. Hence, the policy matches, as indicated by output 716.

A fifth new option is the "ordered" option. When used, the ordered option indicates that the rules in the policy must match events in the same order that the rules occur in the policy. When the ordered option is not used, if there are three rules in the policy (for example), then the these three rules may match any captured system event in any order (subject to any offset or depth options). When the ordered option is used, the events in the list of captured events must match the list of rules in the policy in the exact order in which the rules occur (subject to any distance or within options).

Default settings for all of the above options may be used with all policies used within the behavior monitoring system or only with certain policies. For example, absent any specified option settings, default settings for a particular policy may indicate that no offset shall be used, that no maximum depth shall be used, that a distance option value of zero shall be used, that a large value for the within option (such as 10) shall be used, and that the ordered option shall be enabled. These policies and rules, any default settings, and the various options and the values associated with a particular policy or with a particular rule are stored within rules database 1006 and are retrieved by state machine 1008 during execution of the behavior matching algorithm as described below.

A variety of other options are possible. For example, an option "occurrence/interval" defined on a particular rule means that the event defined by the rule must occur several times in an interval. For example, if the "occurrence/interval" value is "5 times/1 sec," this means the event must occur 5 times in one second. As described above, the "offset," "ordered" and "depth" options are defined at the policy level and are relevant to the policy as a whole, while the "distance," "within" and "occurrence/interval" options are defined at the rule level and are applicable to individual rules.

Typically, a software engineer determines what the values should be for these options based upon experience and by extracting useful information from a malware database. A malware database lists and describes malware behavior such as: file changes, which files are dropped, registry changes, API calling sequences, event sequences, etc.

Pattern Match Function

In an embodiment of the present invention, a state machine 1008 is used to implement the behavior matching algorithm as described below. Among other functionalities described below, the behavior matching algorithm makes use of a pattern match function to determine if a given event matches a particular rule or rules in a policy. A function such as Aho-Corasick may be used. Aho-Corasick is a string searching algorithm that is one type of dictionary-matching algorithm that locates elements of a finite set of strings (the "dictionary") within an input text. It matches all patterns at once, so the complexity of the algorithm is linear with respect to the length of the patterns, plus the length of the searched text, plus the number of output matches. When the pattern dictionary is known in advance, the construction of the automaton can be performed once off-line and the compiled automaton stored for later use. In this case, its run time is linear in the length of the input plus the number of matched entries.

While the Aho-Corasick algorithm is described as being used by the behavior matching algorithm, it is merely one example of a pattern match function that may be used by the behavior matching algorithm. One of ordinary skill in the art will recognize that other functions may be used. For example, a simple linear match function may be used. With a linear match the matching states are ignored and all rules are scanned. The next state is then updated in the process state tree.

State Machine Example

As mentioned above, a state machine is used to implement the behavior matching algorithm. Process information is used to implement the options such as depth, offset, distance, within and ordered. The process information includes the position of an event (in the list of events) and timestamp of a captured event. The position of a particular matched event is used to implement the options "depth," "offset," "distance," and "within," for example. By way of example, if the first captured event of a particular process has matched rule 1 of policy 1, the process information for that rule and policy will record "position 1" and a timestamp. (In the number of events the process has caused to occur, position 1 means the first event that the process has caused to occur.) If another event of the same process matches rule 2 of policy 1, and that event position is 6, then the distance between rule 2 and rule 1 is 5, so the position information can be used to implement the "within" or "distance" option, for example. And we can use the timestamp to implement the options "ordered" and "occurrence/interval."

In one embodiment of the present invention, a rule tree is constructed where the states correspond to the nodes of the tree; the initial state is 0, the root. An example rule tree will be presented in more detail below after a discussion of the functions used to control the state machine.

Control is handled by three functions. The first is a "Goto" function. This may be represented as G(Q, A), which returns the next state from current state Q by matching target event A with any rule that labels an edge from state Q. If state Q and V are linked, and an edge (Q,V) is labeled by A, then G(Q, A)=V. G(0, A)=0 for each event A that does not match a rule that labels an edge out of the root. In other words, the state machine stays at the initial state (root) while scanning non-matching events. Otherwise, if the current target event does not match any rules, the state machine will stay in the original state. That is G(Q, A)=Q.

The second function is the "Failure" function. This may be represented as F(Q) for Q!=0, which returns the next state when a mismatch occurs. Thus, a failed transition (due to a mismatch) does not miss an occurrence of other potential policy matches. For example, consider two policies: policy 1 (Rule A, Rule B, Rule C, Rule E) and policy 2 (Rule B, Rule C, Rule D). Now, captured events are sent to the state machine for matching. The sequence of the incoming events is (Event A, Event B, Event C, Event D). Assume that Event A matches Rule A, Event B matches Rule B, etc.

Figure 14:
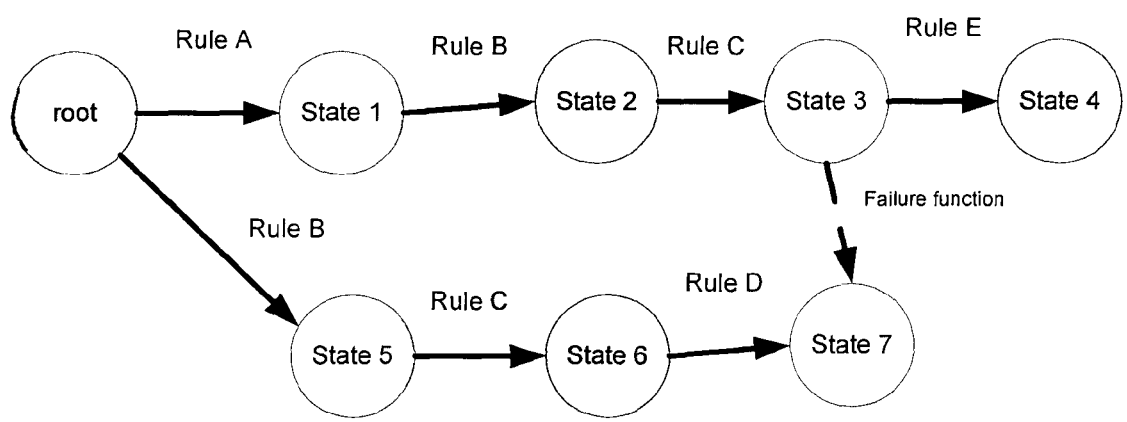
FIG. 14 is a diagram illustrating an example rule tree in accordance with an embodiment of the present invention.

FIG. 14 illustrates the rule tree 1300 for this example. Thus, when we receive Event A, the state machine will go to state 1, when we receive Event B, the state machine will go to state 2, we receive Event C, the state machine will go to state 3. Next, we receive Event D. But, the Event sequence "ABCD" does not match the Policy 1 sequence "ABCE." The Event sequence "ABCD," however, does match the Policy 2 sequence BCD. Using the failure function, we match the last event D, and the state machine goes to state 6, matches rule D, and then goes to state 7. The failure function uses tables to keep track of which policies are currently being matched. In this example, even though policy 1 is currently being matched and the state machine arrives at state 3, a table keeps track of policy 2 being partially matched and the state machine potentially being in state 6. Once Event D occurs, and there is a failure to match at state 3, reference to this table reveals that policy 2 is in state 6, and that Event D will match a transition from state 6 to state 7.

The third function is the "output" function. This may be represented as OUT(Q), which returns the set of events recognized when entering state Q. In other words, the output is the set of rules labeling edges emanating from state Q.

Thus, the rule tree traversal algorithm becomes:

```
Input: Event T
Q := 0;                    // initial state (root)
if G(Q, T) = 0;
{
    Q := F(Q);             // follow a failure
    Q := G(Q, T);          // follow a goto
}
``` if OUT(Q) !=0; then insert OUT(Q) into the process state tree to determine whether the policy matches or not, and then update the process state tree by analyzing all options in use.

Because the behavior matching algorithm includes the pattern match function and also implementation and updating of the process state tree, each option in use is examined even when a rule has matched an event. The process state tree thus reflects whether the status of the policy, including use of all options. Further, if an event has matched a rule in the state machine, but an option is not satisfied, then the tree traversal algorithm will inform the state machine go back to the previous state.

The following is an example of use of the state machine and rule tree in determining whether a policy has been matched in order to detect malware. Preferably, a policy or policies and any corresponding options are retrieved from rules database 1006. Assume there are two policies as follows with these options:

Policy 1: Offset[3], Ordered
Rule 1—(Process Write Registry)
Rule 2—(Process Create Process), Distance[2]
Rule 3—(Process Cleanup Process),
Policy 2: Depth[12]
Rule 1—(Process Write Registry)
Rule 2—(Process Create Process)
Rule 3—(Process Terminate Process), Within[2]
Rule 4—(Process Read Registry)

These policies are then embodied in a rule tree and analyzed as described below. Any time a new policy is received, the rule tree for the set of policies (or for a single policy) is reconstructed. Preferably, the rule tree is created by a policy management module. Each time the behavior monitoring system starts its services, it will parse the policy (or policies) to be used and construct the rule tree. The rule tree is then stored in the state machine in memory.

FIG. 8A is a diagram illustrating an example rule tree 800 in accordance with an embodiment of the present invention. Since the first two rules are identical for the two policies, these policies are essentially merged so that there is only one path in the tree until state 2 is reached. At that point, the tree splits into two branches, 816 for the first policy and 820, 824 for the second policy.

Once the rules and policies have been formulated and stored in rules database 1006, and the rule tree formed, system 1000 is ready to begin event capturing using module 1004 and then behavior matching using state machine 1008. The following example will be used to illustrate operation of the state machine. Assume that module 1004 has begun capturing events and that the first event captured (Process Write Registry) is sent to the behavior matching algorithm. As described earlier, the event captured pertains to a particular process that is being analyzed to determine if it exhibits suspicious behavior or is malware. This first captured event will match the first rule in each policy. Thus, the state machine moves from state 804 to state 808.

As mentioned above, all events are captured from all running processes and organized by which process causes which events. The rule tree may then be used to analyze whether an individual process satisfies a particular policy, and these results for each process are kept track of in a process state tree as described below. It is contemplated that there may be many processes being analyzed at the same time, and that many process state trees will exist. It is possible that while one process matches a policy of the rule tree, the other processes will not. A process matching a policy is deemed suspicious.

FIG. 8B is a diagram illustrating the example rule tree having entered state 1. At this point, however, even though the first rule is matching, the policies may or may not be matched, depending upon the options selected and any other rules in the policies. Thus, a process state tree is created to check whether there is a policy match.

FIG. 9A is a diagram illustrating a process state tree 900 after a first match. The input for creation of tree 900 is the name of the process A for which events have been captured, current state 808, and that this state belongs to (policy 1, rule 1) and (policy 2, rule 1). A process A node 901 is created as the root of this state tree. State 1 belongs to both policy 1 and policy 2 (as rule 1 in each is the same), and as such nodes are created for each policy. Policy 1 node 902 has a subnode 904 indicating the matching rule and its position. Policy 2 node 906 also has a subnode 908 indicating the matching rule and its position. Position refers to the position of the matched event in the list of captured events. However, even though policy 1 has a first match in rule 1, because policy 1 has an offset of 3, the policy is considered not matching because the matched event is not fourth or later. Hence, node 902 may then be deleted. Nodes 906 and 908 remain because the rule has matched and no other options (ordered, depth, offset, within) apply to this policy and rule. Thus, the above-described options are checked to determine whether a subnode shall be placed below policy node and whether a particular subnode should be deleted because a restriction of an option has not been complied with.

Next, a second event (Process Create Process) for process A has been captured and is submitted to the matching algorithm; it matches rule 2 of each policy. The state machine then moves to state 2.

Figure 8C:
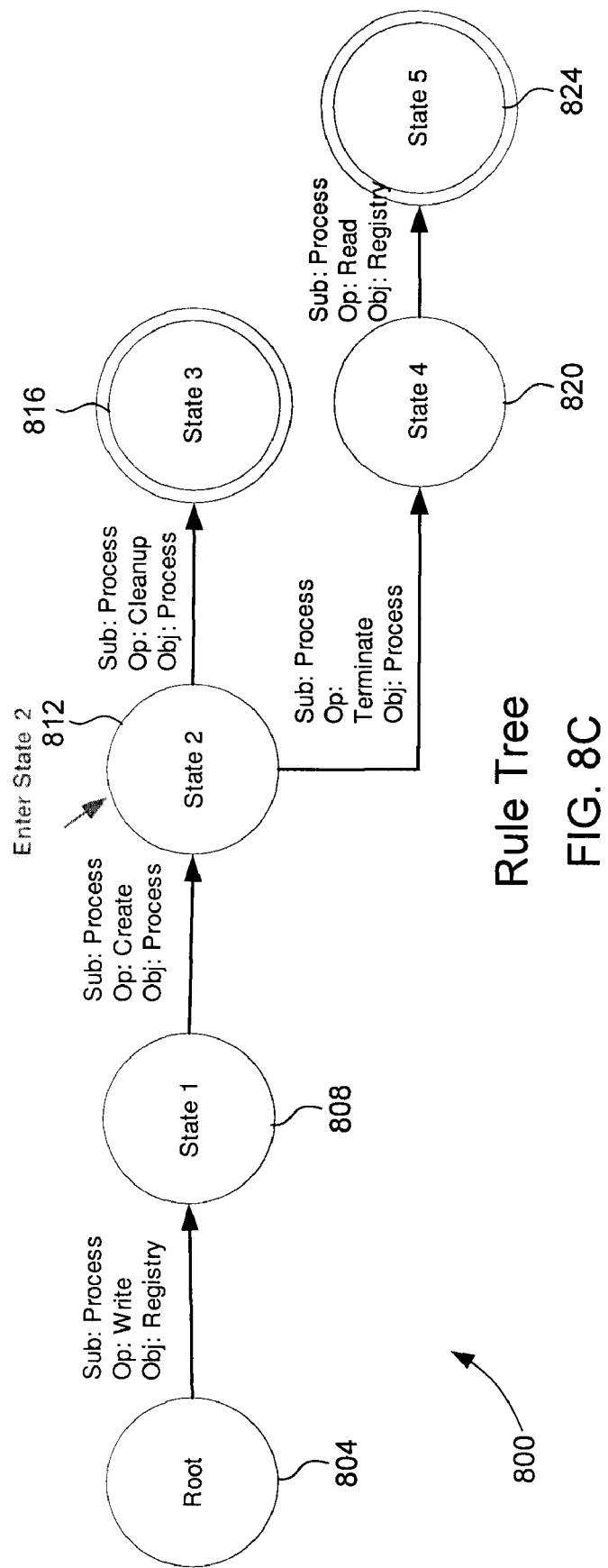
FIG. 8C is a diagram illustrating the example database tree having entered state 2 in accordance with an embodiment of the present invention.
Figure 9B:
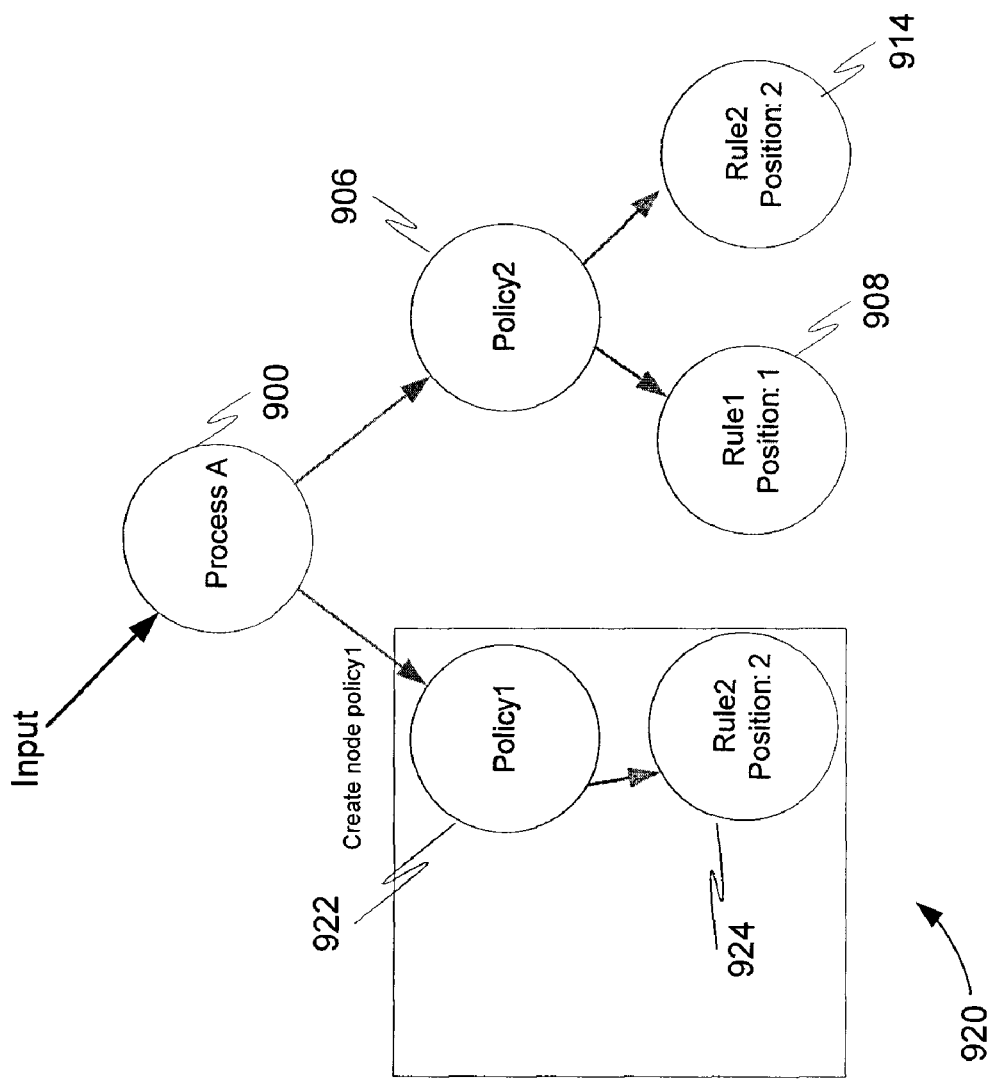
FIG. 9B is a diagram illustrating a process state tree after a second state in accordance with an embodiment of the present invention.

FIG. 8C is a diagram illustrating the example rule tree having entered state 2. Here, again, there is a match with rule 2, but it may or may not be a complete policy match. The process state tree is then examined to determine whether there is a policy match. FIG. 9B is a diagram illustrating process state tree 920 after a second match. Here, since a node for policy 1 had previously been deleted, it must be created again here as node 922. The rule and position match subnode 924 are then created for state 2. Likewise, for policy 2 906, a second subnode 914 is added. All options are checked to ensure compliance. For policy 1, since the policy thus far does not have a matching rule 1, it is a non-matching policy because the policy requires the option "ordered," and once again the nodes 922, 924 for policy 1 are deleted. The option "ordered" is not satisfied because rule 1 must be matched first for policy 1 to be satisfied. On the other hand, the depth so far for the matched events of policy 2 is less than 12; thus policy 2 is still a match.

Figure 8D:
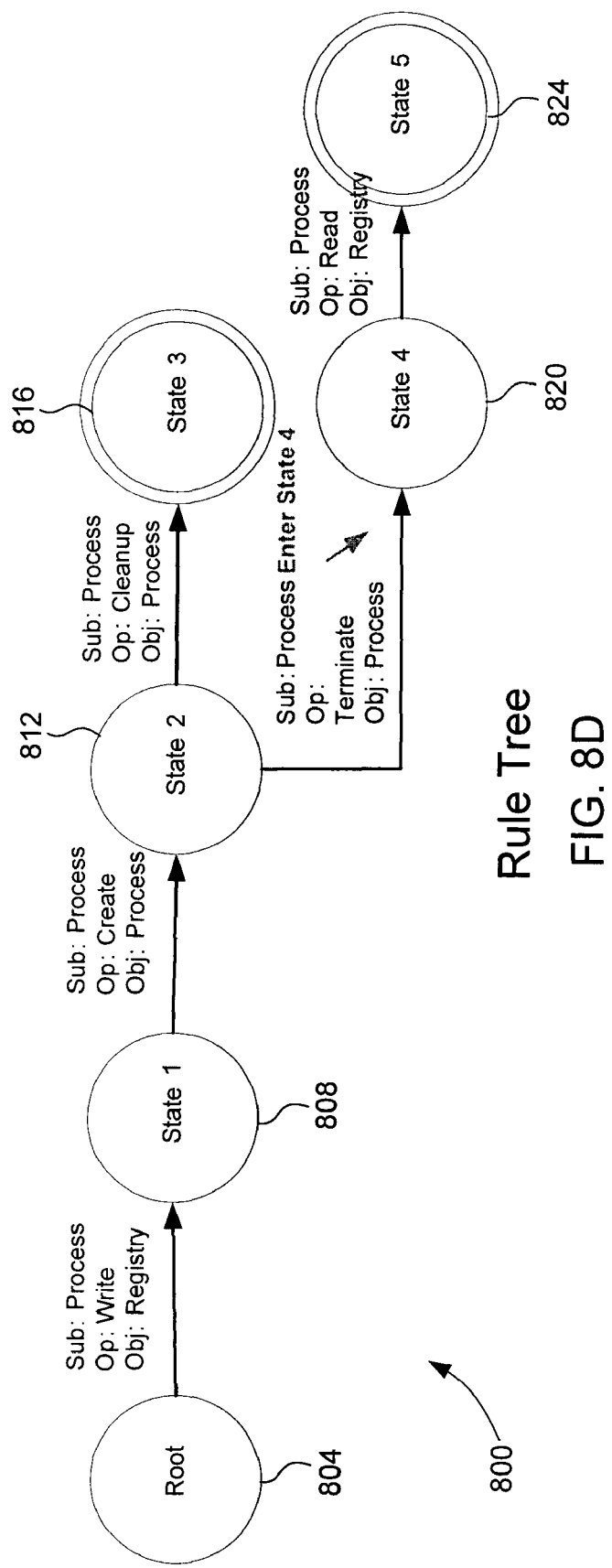
FIG. 8D is a diagram illustrating the example database tree having entered state 4 in accordance with an embodiment of the present invention.

Next, a third event (Process Terminate Process) for process A has been captured and is submitted to the matching algorithm; it matches rule 3 of policy 2. But since there is no match for policy 1 so far, the node for state 3 in FIG. 8C is not reached. The state machine thus moves on to state 4 and not to state 3. FIG. 8D is a diagram illustrating the example rule tree 800 having entered state 4. Here, again, there is a match, but it may or may not be a policy match. Since only policy 2 need to be examined along this branch of the tree, there is no need to create a node for policy 1. FIG. 9C is a diagram illustrating process state tree 940 after a third match. Here, a third subnode 944 is created for state 4. The distance between the second and third events (a distance of zero) is within the specified "within" option value of 2, hence policy 2 is still matched up to this point.

Figure 8E:
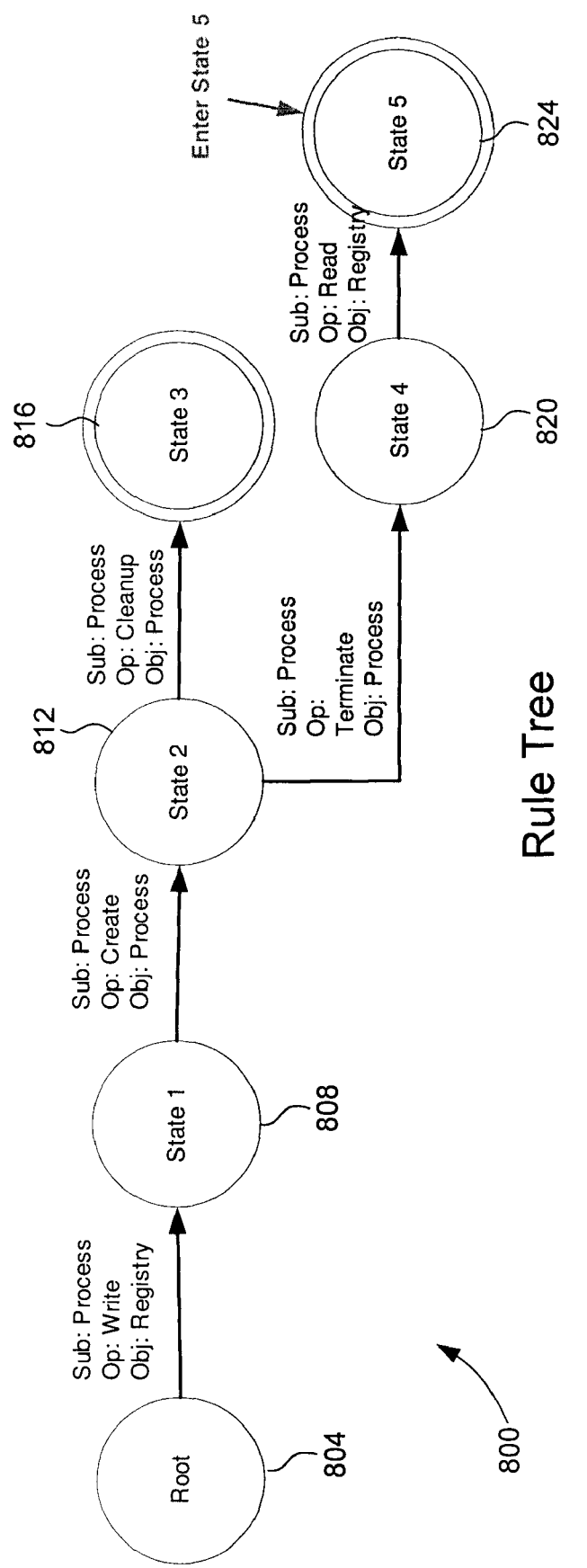
FIG. 8E is a diagram illustrating the example database tree having entered state 5 in accordance with an embodiment of the present invention.

Next, a fourth event (Process Read Registry) for process A has been captured and is submitted to the matching algorithm; it matches rule 4 of policy 2. The state machine then moves to state 5. FIG. 8E is a diagram illustrating the example rule tree having entered state 5. Here, again, there is a match, but it may or may not be a policy match. Since only policy 2 needs to be examined along this branch of the tree, there is no need to create a node for policy 1.

Figure 9D:
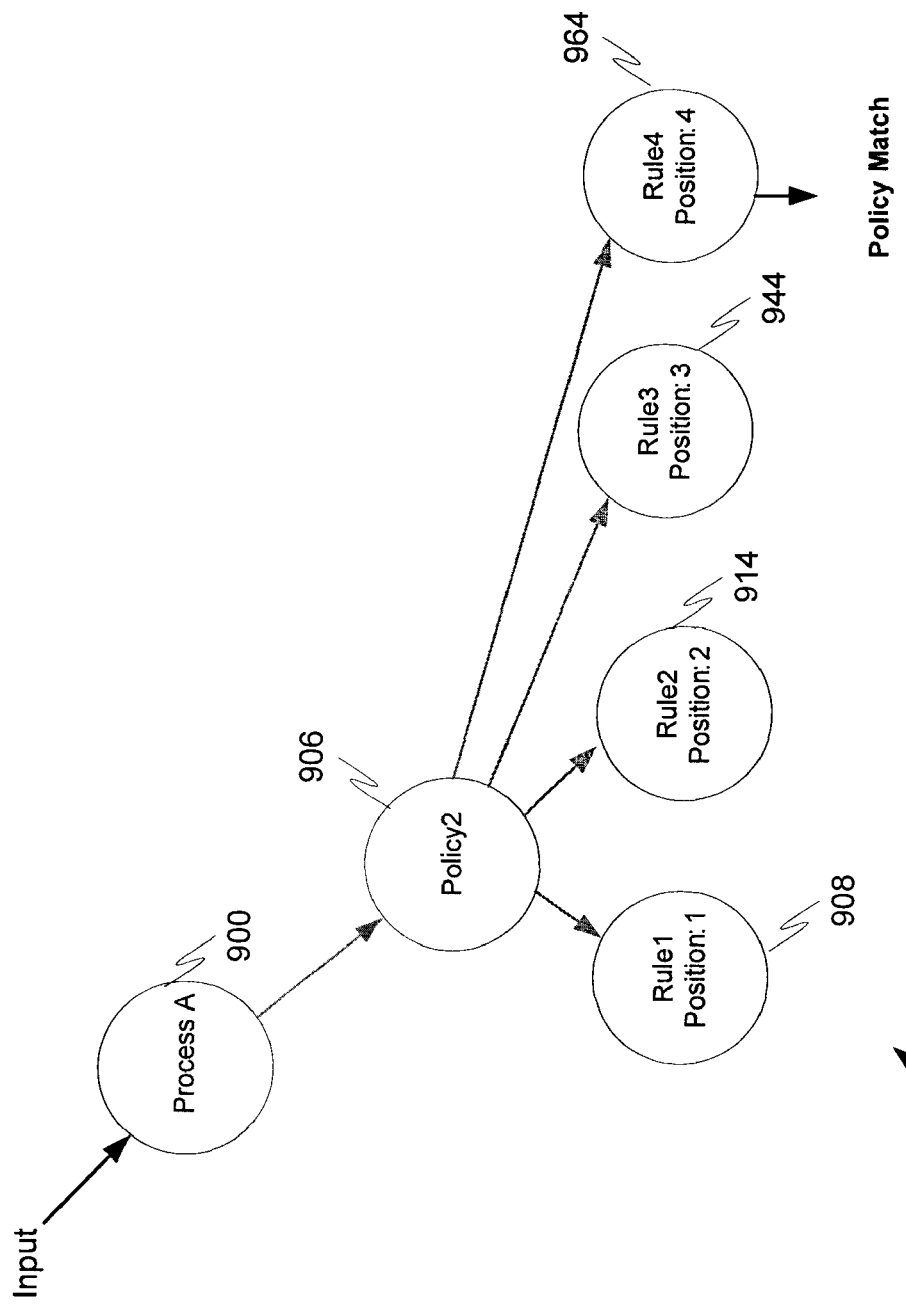
FIG. 9D is a diagram illustrating a process state tree after a fourth state in accordance with an embodiment of the present invention.

FIG. 9D is a diagram illustrating process state tree 960 after a fourth match. Here, a fourth subnode 964 is created for state 5. The depth of the third and fourth events is still within the specified depth, hence policy 2 is still matched.

Because all four rules of policy 2 have now matched certain of the captured events for a particular process, the output of this state machine 1008 is then a policy match for policy 2 but not for policy 1. A policy match output may occur and be used in a variety of manners. For example, the result of a policy match may be used to alert the user, perform a scan, perform recovery, terminate the process, give feedback, etc., as described above.

System Diagram

Figure 10:
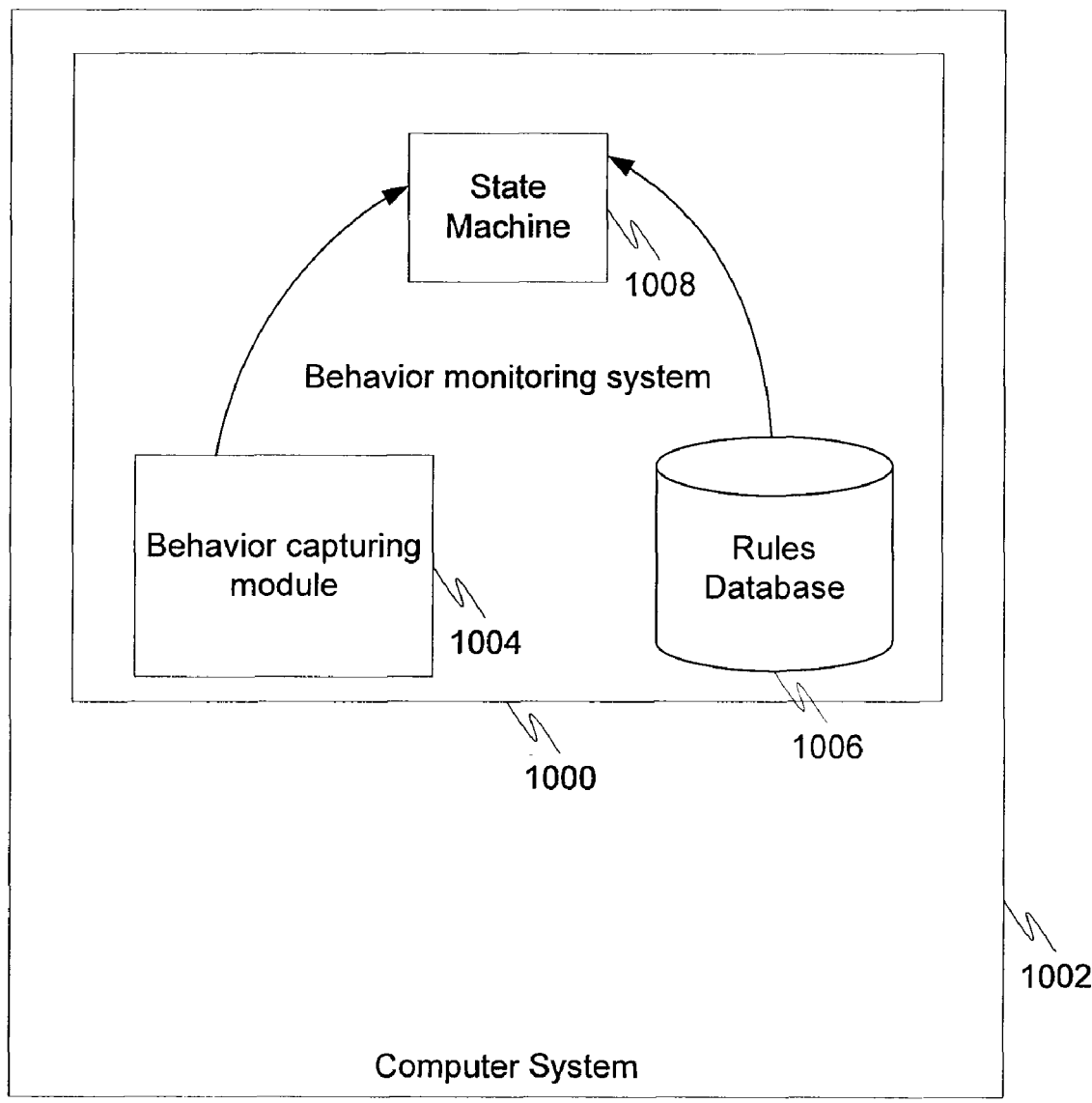
FIG. 10 is a diagram illustrating a behavior monitoring system in accordance with an embodiment of the present invention.

FIG. 10 is a diagram illustrating a behavior monitoring system in accordance with an embodiment of the present invention. The behavior monitoring system 1000 monitors computer system 1002. It should be noted that the behavior monitoring system 1000 may either be located in computer system 1002, or may be located outside computer system 1002. For simplicity, FIG. 10 depicts the behavior monitoring system inside computer system 1002, but nothing in this figure shall be construed as limiting the invention to such an implementation.

Behavior monitoring system 1000 includes a behavior capturing module 1004 that acts to capture system behavior using driver hooks. Behavior monitoring system also includes rules database 1006 used to store the rules, policies and options to be applied during behavior monitoring. Behavior monitoring system 1002 also includes a state machine 1008 that executes a behavior matching algorithm using the rules and policies from the rules database. In addition, the pattern matching function that matches a rule to an event is preferably part of the state machine, although it may be implemented separately.

It should be noted that each of the components in the behavior monitoring system 1000 may either be stand-alone components or may be combined with other components in a computer system. For example, rules database 1006 need not be a stand-alone database. Rather, this database may be located in memory that is shared with other computing tasks, such as memory operated by computer system 1002. Likewise, state machine 1008 may be operated by a processor of computer system 1002.

Figure 11A:
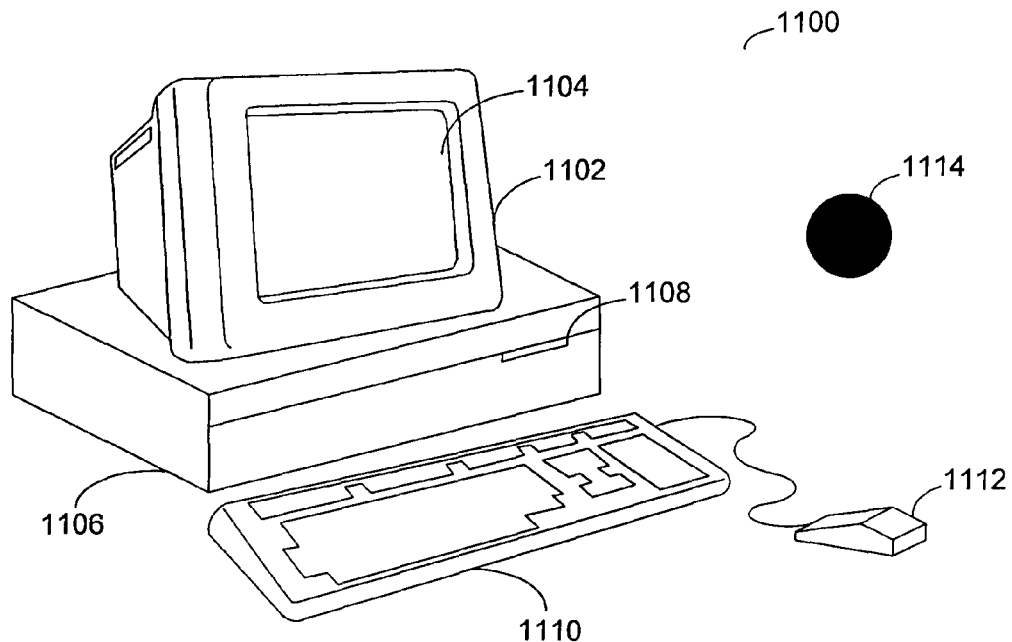
FIG. 11A shows one possible physical form of the computer system 1002 in accordance with an embodiment of the present invention.

FIG. 11A shows one possible physical form of the computer system 1002 in accordance with an embodiment of the present invention. Of course, the computer system may have many physical forms including an integrated circuit, a printed circuit board, a small handheld device (such as a mobile telephone or PDA), a personal computer or a super computer.

Computer system 1100 includes a monitor 1102, a display 1104, a housing 1106, a disk drive 1108, a keyboard 1110 and a mouse 1112. Disk 1114 is a computer-readable medium used to transfer data to and from computer system 1100.

Figure 11B:
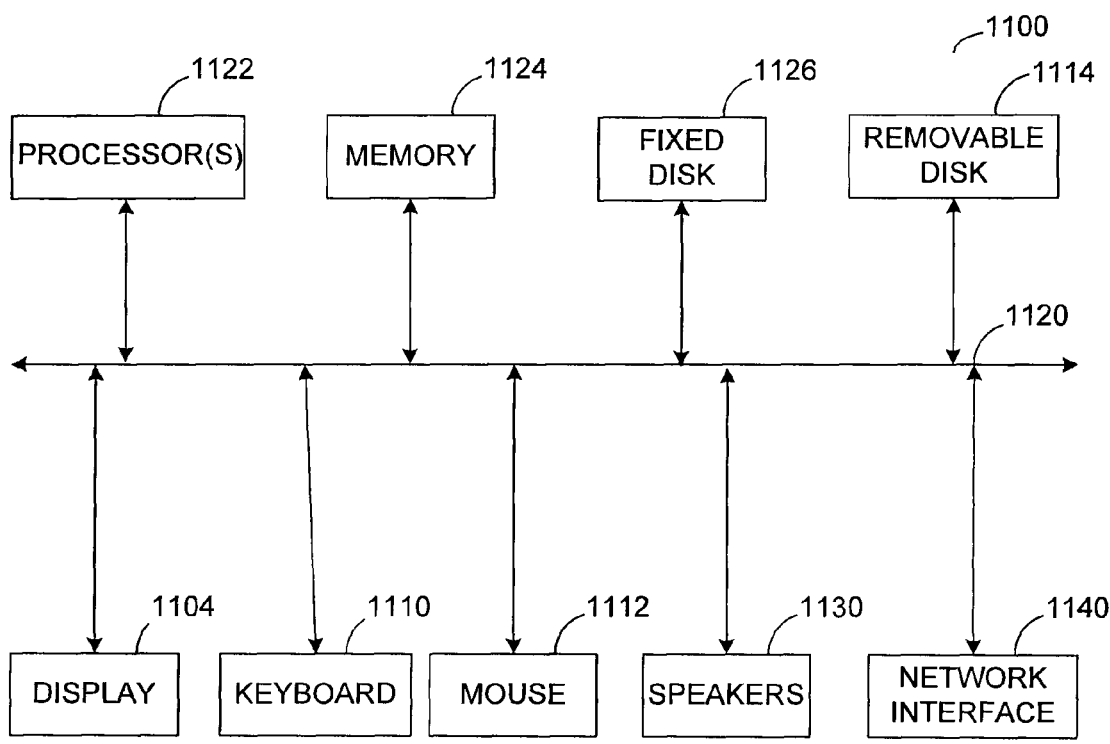
FIG. 11B is an example of a block diagram for computer system 1100 in accordance with an embodiment of the present invention.

FIG. 11B is an example of a block diagram for computer system 1100 in accordance with an embodiment of the present invention. Attached to system bus 1120 are a wide variety of subsystems. Processor(s) 1122 (also referred to as central processing units, or CPUs) are coupled to storage devices including memory 1124. Memory 1124 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 1126 is also coupled bi-directionally to CPU 1122; it provides additional data storage capacity and may also include any of the computer-readable media described below. Fixed disk 1126 may be used to store programs, data and the like and is typically a secondary storage medium (such as a hard disk) that is slower than primary storage. It will be appreciated that the information retained within fixed disk 1126, may, in appropriate cases, be incorporated in standard fashion as virtual memory in memory 1124. Removable disk 1114 may take the form of any of the computer-readable media described below.

CPU 1122 is also coupled to a variety of input/output devices such as display 1104, keyboard 1110, mouse 1112 and speakers 1130. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 1122 optionally may be coupled to another computer or telecommunications network using network interface 1140. With such a network interface, it is contemplated that the CPU might receive information from the network, or might output information to the network in the course of performing the above-described method steps. Furthermore, method embodiments of the present invention may execute solely upon CPU 1122 or may execute over a network such as the Internet in conjunction with a remote CPU that shares a portion of the processing.

High-Level Flow Diagram

Figure 12:
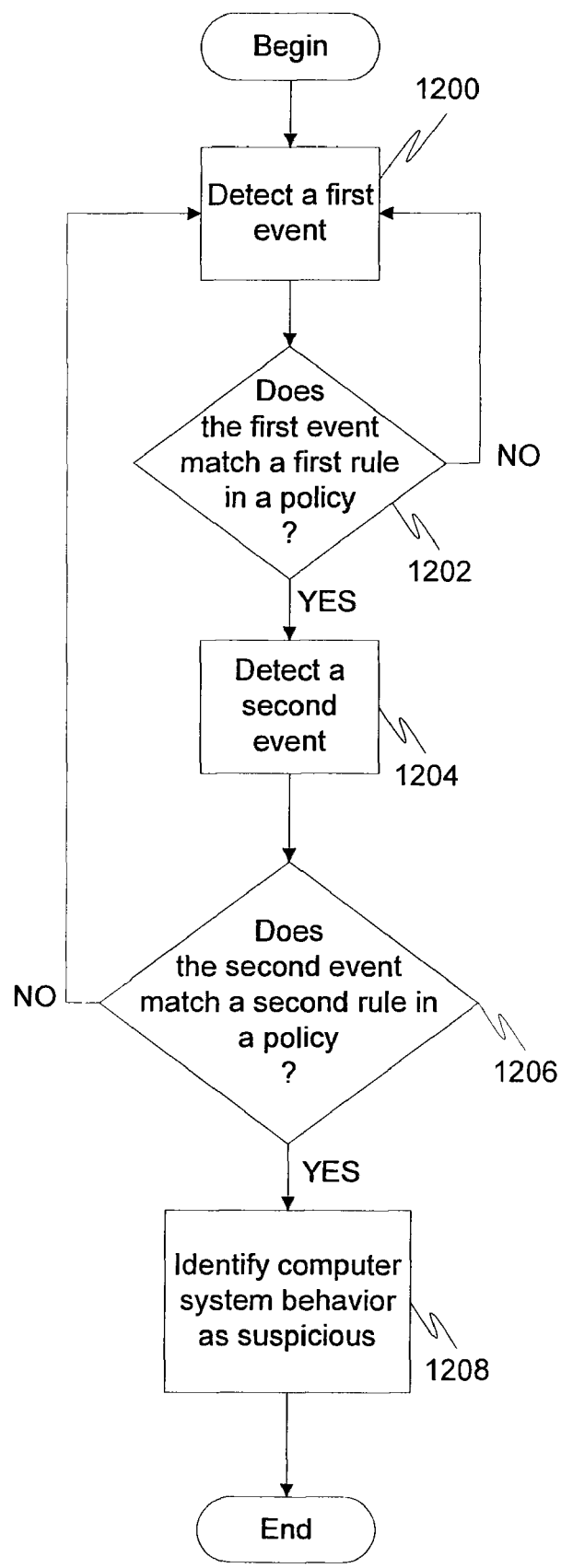
FIG. 12 is a flow diagram illustrating a method of monitoring computer system behavior in accordance with an embodiment of the present invention.

FIG. 12 is a flow diagram illustrating a method of monitoring computer system behavior in accordance with an embodiment of the present invention. At 1200, a first event is captured. At 1202, it is determined if the first event matches a first rule in a policy. If so, then at 1204, a second event is detected. At 1206, it is determined if the second event matches a second rule in the policy. If so, then at 1208 it is determined that the behavior causing the events is identified as suspicious. In other words the process that has caused these events to occur, and the computer file or files containing the computer code for executing the process, identified as suspicious. Any of a variety of steps may then be taken to scan the file or files, alert the user, terminate the process, suspend the process, continue monitoring the process or a file, etc.

Additional steps may be included when it is determined that options have been specified for the policy or for an individual rule. These steps are performed, for example, whenever a matching rule is found for a particular event. Alternatively, these steps may be performed once it is determined that multiple events have corresponding rule matches (e.g., right before step 1208). If such optional steps are performed, then the identifying of step 1208 includes identifying the behavior as suspicious if a first event matches the first rule, a second event matches the second rule and the various options are satisfied.

The options described above include: an "offset" option, wherein the offset specifies a number of events that must occur prior to a matching event occurring; a "depth" option, wherein the depth specifies a limit on the number of events that are considered for matching to rules; a "distance" option, wherein the distance specifies a number of events that must occur between a first matching event and a second matching event; a "within" option, wherein "within" specifies a number of events within which a second matching event must occur after a first matching event; and an "ordered" option, wherein events must occur in the same order as the rules occur.

It should be noted that the steps in this method can be extended to an unlimited number of rules and events. For simplicity, only two events and rules are described in FIG. 12, but this should not be taken in any was as limiting the number of events or rules. Additionally, multiple executions of the method of FIG. 12 may be operated simultaneously in order to cover multiple policies. Further, the method may be executed in parallel (or serially) to cover any number of processes executing on a computer system that are suspected of being malware.

Program Storage Device Embodiment

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A computer-implemented method of monitoring computer system behavior of a process, said method comprising:

retrieving a policy having a plurality of rules and a within option for use in monitoring the behavior of a process in a computer wherein each of said rules identifies an event that may occur in said computer and said within option specifies a numeric value;

capturing, by said computer, a first event occurring in said computer said first event being associated with said process;

ascertaining whether said first event matches the first rule of said plurality of rules;

capturing, by said computer, one or more additional events occurring in said computer each of said one or more additional events being associated with said process and occurring after said first event;

capturing, by said computer, a second event occurring in said computer said second event being associated with, said process and occurring after said one or more additional events;

ascertaining whether said second event matches a second rule of said plurality of rules;

ascertaining whether a count of said one or more additional events is less than or equal to said numeric value; and identifying that the behavior of said process matches said policy when said first event matches said first rule, said second event matches said second rule, and the count of said one or more additional event is less than or equal to said numeric value said.

2. A computer-implemented method as recited in claim 1 wherein said numeric value is greater than or equal to 1.

3. A computer-implemented method of monitoring the behavior of a process in a computer, comprising:

retrieving a policy having a plurality of rules and a distance option for use in monitoring the behavior of a process in a computer, wherein each of said plurality of rules identifies an event that may occur in said computer and said distance option specifies a numeric value;

capturing, by said computer, a first event occurring in said computer, said first event being associated with said process;

ascertaining whether said first event matches a first rule of said plurality of rules;

capturing, by said computer, one or more additional events occurring in said computer, each of said one or more additional events being associated with said process and occurring after said first event;

capturing, by said computer, a second event occurring in said computer, said second event being associated with said process and occurring after said one or more additional events;

ascertaining whether said second event matches a second rule of said plurality of rules;

ascertaining whether a count of said one or more additional events is greater than or equal to said numeric value; and identifying that the behavior of said process matches said policy when said first event matches said first rule, said second event matches said second rule, and the count of said one or more additional event is greater than or equal to said numeric value.

4. A computer-implemented method as recited in claim 3 wherein said numeric value is greater than or equal to 1.

5. A computer-implemented method of monitoring the behavior of a process in a computer, comprising:

retrieving a policy having a plurality of rules and an offset option for use in monitoring the behavior of a process in a computer, wherein each of said plurality of rules identifies an event that may occur in said computer and said offset option specifies a numeric value;

capturing, by said computer, a plurality of events occurring in said computer, each of said plurality of events being associated with said process;

ascertaining whether a count of said plurality of events is equal to said numeric value;

capturing, by said computer, a first event occurring in said computer, said first event being associated with said process and occurring after said plurality of events;

ascertaining whether said first event matches a first rule of said plurality of rules;

capturing, by said computer, a second event occurring in said computer, said second event being associated with said process and occurring after said plurality of events;

ascertaining whether said second event matches a second rule of said plurality of rules; and identifying that the behavior of said process matches said policy when said first event matches said first rule, said second event matches said second rule, and the count of said plurality of events equals said numeric value.

6. A computer-implemented method as recited in claim 5 wherein said numeric value is greater than or equal to 1.

7. A computer-implemented method of monitoring the behavior of a process in a computer, comprising:

retrieving a policy having a plurality of rules and a depth option for use in monitoring the behavior of a process in a computer, wherein each of said rules identifies an event that may occur in said computer and said depth option specifies a numeric value;

capturing, by said computer, a plurality of events occurring in said computer, each of said plurality of events being associated with said process;

ascertaining whether a count of said plurality of events is less than or equal to said numeric value;

ascertaining whether a first event of said plurality of events matches a first rule of said plurality of rules;

ascertaining whether a second event of said plurality of events matches a second rule of said plurality of rules; and identifying that the behavior of said process matches said policy when said first event matches said first rule, said second event matches said second rule, and the count of said plurality of events is less than or equal to said numeric value.

8. A computer-implemented method as recited in claim 7 wherein said numeric value is greater than or equal to 1.

* * * * *